UNITED STATES PATENT OFFICE.

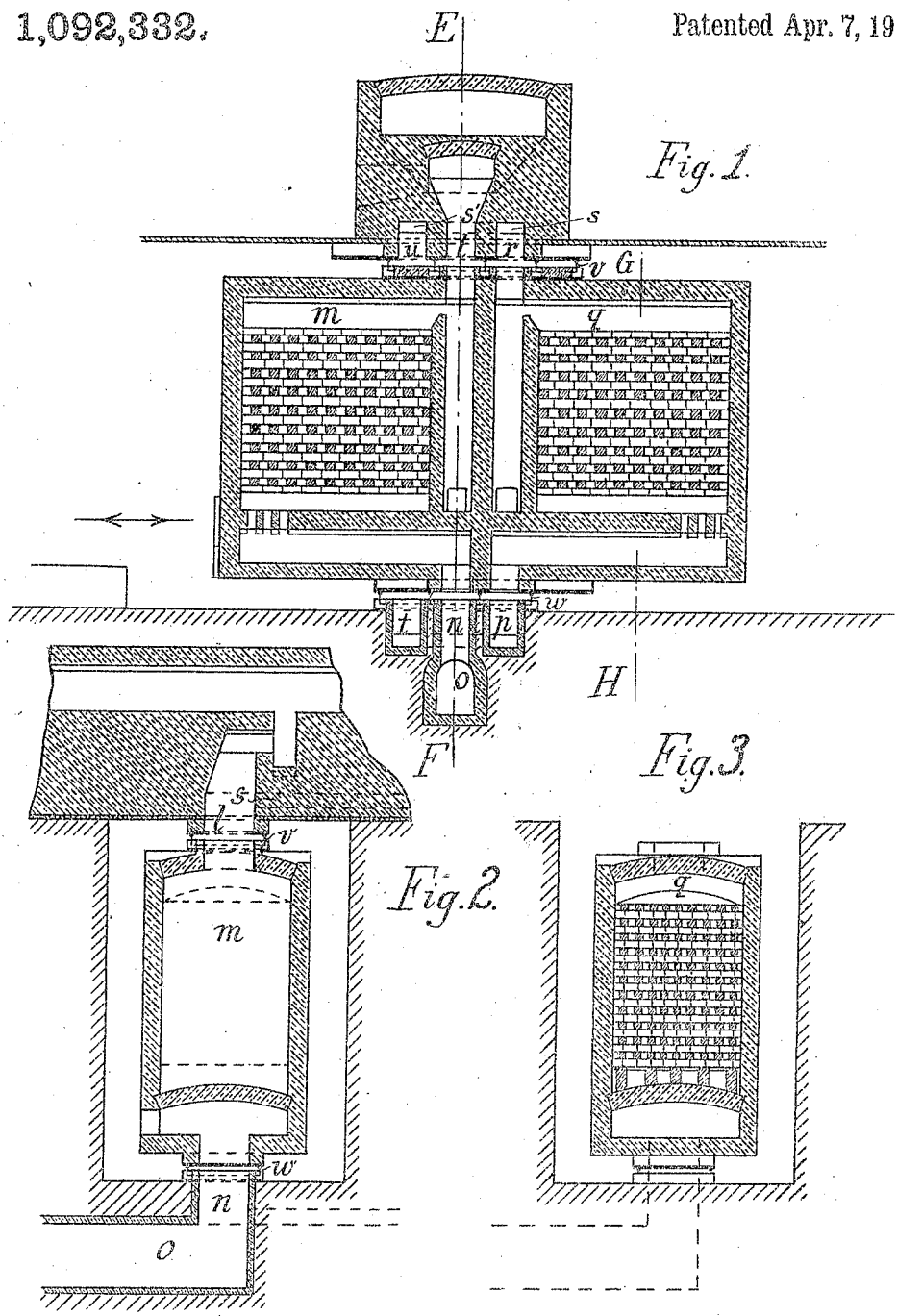

ALFRED BRÜNINGHAUS, OF DUISBURG-RUHRORT, GERMANY.

REGENERATOR.

1,092,332.

Specification of Letters Patent. Patented Apr. 7, 1914.

Application filed November 29, 1912. Serial No. 734,167.

*To all whom it may concern:*

Be it known that I, ALFRED BRÜNINGHAUS, a subject of the German Emperor, residing at Duisburg-Ruhrort, in Germany, have invented certain new and useful Improvements in Regenerators, of which the following is a specification.

The object of this invention is to provide improved means enabling the advantages of regenerative working, either for preheating air for combustion, combustible gas, or mixtures of air and combustible gas, to be utilized in connection with furnaces and ovens in which reversal of the direction of the flame is impracticable or inconvenient.

An embodiment of the invention is shown in the accompanying drawing, Figure 1 being a vertical, longitudinal section of the apparatus, Fig. 2 a cross-section on the line E—F of Fig. 1, and Fig. 3 a section on the line G—H of Fig. 1.

The apparatus shown comprises two horizontally movable regenerator chambers $m$ and $q$. In the position shown in Fig. 1, products of combustion pass from the furnace along the conduit $l$, through the chamber $m$ to the discharge conduit $n$ and thence through the flue $o$ to the chimney, while air or a mixture of air and combustible gas flows in from the conduit $p$ through the chamber $q$ to the conduit $r$, and thence through the conduit $s$ to the furnace. By moving the chambers to the left, from the position shown in Fig. 1, the chamber $q$ can be placed so that products of combustion enter the same from the conduit $l$, and pass out at $n$, while air or a mixture of air and combustible gas is admitted to the chamber $m$ from the conduit $t$ and then flows through the conduit $u$ to the conduit $s'$. In this position of the regenerator the connections between the conduits $p$ and $r$ and the ports in the chambers are sealed by means of suitable packings $v$ and $w$, similar packings being provided for closing the open ends of the conduits $t$ and $u$ in the position shown in Fig. 1.

What I claim as my invention and desire to secure by Letters Patent of the United States is:—

In regenerating apparatus the combination of three stationary induction conduits, three stationary eduction conduits, and two regenerator chambers each having two ports and collectively reciprocatable on a horizontal path, whereby each port of each chamber can be brought to register with an induction conduit and an eduction conduit alternatively, one of the induction conduits and one of the eduction conduits being arranged to serve both chambers alternatively.

In witness whereof I have signed this specification in the presence of two witnesses.

ALFRED BRÜNINGHAUS. [L. S.]

Witnesses:
 HELEN NUFER,
 ALBERT NUFER.